(12) United States Patent
Jeon et al.

(10) Patent No.: US 7,134,379 B2
(45) Date of Patent: Nov. 14, 2006

(54) GAS CYLINDER

(76) Inventors: Young Sang Jeon, Hyundae APT. 4-1007, Sinraewon-ri 528, Yesan-eup, Yesan-goon, Choongchungnam-do (KR); Dong Kwan Ma, Mogryendong APT. 805-506, Hogye-dong 1053-4, Dongan-gu, Anyang-si, Gyeonggi-do (KR); Ki Cheol Lee, Ganseokl-dong 450-6, Namdong-gu, Incheon-si (KR)

( * ) Notice: Subject to any disclaimer, the term of this patent is extended or adjusted under 35 U.S.C. 154(b) by 458 days.

(21) Appl. No.: 10/607,314

(22) Filed: Jun. 27, 2003

(65) Prior Publication Data

US 2004/0061367 A1  Apr. 1, 2004

(30) Foreign Application Priority Data

Jul. 15, 2002 (KR) .................. 10-2002-0041300
Nov. 1, 2002 (KR) .................. 20-2002-0032709

(51) Int. Cl.
*F15B 11/08* (2006.01)
*F16D 1/00* (2006.01)

(52) U.S. Cl. .................. 91/437; 92/258; 297/344.19; 403/353; 403/397

(58) Field of Classification Search .................. 92/51, 92/52, 255, 257, 258; 91/169, 437, 438; 297/344.19; 403/315, 316, 353, 397
See application file for complete search history.

(56) References Cited

U.S. PATENT DOCUMENTS

| | | | | |
|---|---|---|---|---|
| 1,752,544 A | * | 4/1930 | Sparrow | .................. 403/316 |
| 2,476,021 A | * | 7/1949 | Bender | .................. 277/467 |
| 4,960,354 A | * | 10/1990 | Moore | .................. 403/397 |
| 5,377,580 A | * | 1/1995 | Merklein et al. | .............. 92/255 |
| 6,199,952 B1 | | 3/2001 | Davis | |
| 6,276,756 B1 | * | 8/2001 | Cho et al. | .............. 297/344.19 |
| 6,382,077 B1 | * | 5/2002 | Chen | .................. 91/437 |
| 6,474,619 B1 | * | 11/2002 | Ma | .................. 297/344.19 |

* cited by examiner

*Primary Examiner*—Edward K. Look
*Assistant Examiner*—Michael Leslie
(74) *Attorney, Agent, or Firm*—Richard C. Litman

(57) ABSTRACT

Disclosed is a gas cylinder, for improving sealing characteristics of the gas cylinder and improving convenience in manufacturing, including: a valve having a gas opening/closing pin at a through hole in its center, for intermittently passing a gas, and additionally having a valve dividing body seated on a groove approximately in a lower part of the through hole; a spindle to an upper inside of which the valve is inserted; and a piston inserted to an inside of an open cylinder of the spindle, and having, a step threshold formed at a predetermined distance from an upper end, to which an O-ring for maintaining sealing is fit, and having another step threshold ranging from a lower side of the step threshold to a lower end on an inner lateral surface of the piston, to which an O-ring is fit.

19 Claims, 13 Drawing Sheets

GAS CYLINDER

BACKGROUND OF THE INVENTION

1. Field of the Invention

The present invention relates to a gas cylinder and more particularly to a gas cylinder capable of improving sealing characteristics of the gas cylinder, which is important from viewpoint of reliability in performance and operation of the gas cylinder, and of improving convenience in handling upon production of the gas cylinder in production spot.

2. Background of the Related Art

A gas cylinder is an apparatus for use in an automobile, a table, a chair, for making a product more conveniently used, by reducing impulse applied from the outside, or by applying restoring force in one direction. The gas cylinder according to the present invention does not exclude application to different usage such as an automobile, but the gas cylinder more preferably applicable to a chair, will be described as an example.

The gas cylinder is an apparatus for exerting force in one direction the length of the cylinder increases, and in case that a user does not sit on a chair, upon operation of a lever, the length of the cylinder increases by extending force due to air flowing in one direction.

Also, in case that a user sits on a chair, upon operation of a lever, extending force of a spring is suppressed by a weight of a user and the length of the cylinder is reduced.

Construction of a chair in which a gas cylinder of a related art is adopted, is described in detail in U.S. Pat. No. 6,199,952.

In the meantime, the construction of the gas cylinder of a related art will be briefly described in the following. The gas cylinder of a related art includes: a spindle whose inside is filled with gas of high pressure higher than atmospheric pressure; a base tube, to the inside of which the spindle is inserted; a piston whose lower end is fixed in the lower side of the base tube and inserted to the inner space of the spindle. As detailed description of the gas cylinder is known by a plurality of the related arts disclosed, other details will be omitted.

With such construction, the spindle is moved up and down by external force and restoring force due to gas pressure, whereby operation required by the gas cylinder is performed.

In the meantime, the inside of the gas cylinder of a related art is filled with gas of high pressure for operation of the gas cylinder, and the pressure of the gas is considerably higher than the atmospheric pressure. Such high pressure gas filled in the inside of the spindle, has possibility of leaking out even by a small gap. Therefore, sealing structure for preventing such high pressure gas from leaking out, is highly required.

Also, in reality, most of processes are carried out by manual process in the production spot of the gas cylinder. Therefore, it is important point to be resolved in manufacturing process of the gas cylinder to simplify such production process.

SUMMARY OF THE INVENTION

An object of the invention is to solve at least the above problems and/or disadvantages and to provide a gas cylinder capable of preventing high pressure gas filled in the inside of the gas cylinder from leaking out.

Another object of the present invention is to provide a gas cylinder capable of improving convenience for an operator in the production spot of the gas cylinder and of reducing manufacturing costs.

The foregoing and other objects and advantages are realized by providing a gas cylinder including: an integral type valve having a gas opening/closing pin at a through hole in its center, for intermittently passing a gas, and additionally having a valve dividing body seated on a groove approximately in a lower part of the through hole; a spindle to an upper inside of which the valve is inserted; a piston inserted to an inside of an open cylinder of the spindle, and having a step threshold to which an O-ring formed at a predetermined distance from an upper end, for maintaining sealing, is fit, and having another step threshold to which an O-ring is fit on an inner lateral surface of the piston ranging from a lower side of the step threshold to a lower end; a cylinder formed on an inner peripheral surface of the spindle, for guiding the piston; a washer additionally formed on an upper end of the piston; a piston rod whose one end is inserted and fixed to the piston; and a base tube of a cylindrical shape, in an lower side of which the other end of the piston rod is fixed by means of a fixing clip, and whose inner peripheral surface guides up and down operation of the spindle.

According to another aspect of the invention, a gas cylinder includes: an integral type valve having a gas opening/closing pin at a through hole in its center, for intermittently passing a gas, and additionally having a valve dividing body seated on a groove approximately in a lower part of the through hole, for supporting position of inner parts; a spindle, to an upper inside of which the valve is inserted; a piston inserted to an inside of the spindle and having a step threshold formed on an outer periphery at a predetermined distance from an upper end, and to which an O-ring for maintaining sealing, is fit, and having another step threshold to which an O-ring is fit on an inner lateral surface of the piston ranging from a lower side of the step threshold to a lower end; a washer additionally formed on an upper end of the piston, for fixing position of the O-ring; a piston rod whose one end is inserted and fixed to the piston; and a base tube of a cylindrical shape, in an lower side of which the other end of the piston rod is fixed by means of a fixing clip and whose inner peripheral surface guides up and down operation of the spindle.

According to further another aspect of the invention, a gas cylinder includes: an integral type valve having a gas opening/closing pin at a through hole in its center, for intermittently passing a gas; a spindle, to an upper inside of which the valve is inserted; a piston inserted to an inside of an open cylinder of the spindle; a piston rod whose one end is inserted and fixed to the piston; a fixing clip made of elastic material, for fixing the other end of the piston rod, and is bent in an U-shape so that one side and the other side whose ends face each other are formed, wherein the one side has a cut whose interval from the end part is smaller than a diameter of the piston rod and larger than a diameter of a groove of the piston rod, for being fit in the groove of the piston rod, and the other side has a cut which is larger than a diameter of the piston rod, formed apart a predetermined distance from end part so that a lower end of the piston rod goes by a predetermined distance between the one side and the other side, and then passes through to a lower part, and a pressing part extended from the cut formed on the other side, for pressing a lower end of the piston rod, is provided; and a base tube of a cylindrical shape, to which the piston rod is inserted.

According to still further another aspect of the invention, a gas cylinder includes: an integral type valve having a gas opening/closing pin at a through hole in its center, for intermittently passing a gas; a spindle to an upper inside of which the valve is inserted; a piston inserted to an inside of an open cylinder of the spindle; a piston rod whose one end is inserted and fixed to the piston; and a base tube of a cylindrical shape, in which the other end of the piston rod is fixed, and to which the piston rod is inserted, and whose lower end is bent inward, forming a lower bending part for removing unevenness or projecting part due to thermal transformation of the base tube.

According to the gas cylinder of the present invention, sealing of the pressed gas could be guaranteed reliably.

Also, convenience in production spot is improved and manufacturing costs could be reduced.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF PREFERRED EMBODIMENTS

The following detailed description will present a gas cylinder according to a preferred embodiment of the invention in reference to the accompanying drawings. The matters defined in the description such as a detailed construction are nothing but the ones provided to assist in a comprehensive understanding of the invention. Thus, it is apparent that the present invention can be carried out without those defined matters and it will be understood by those skilled in the art that various changes in form and details may be made therein without departing from the spirit and scope of the invention.

Figure 1:
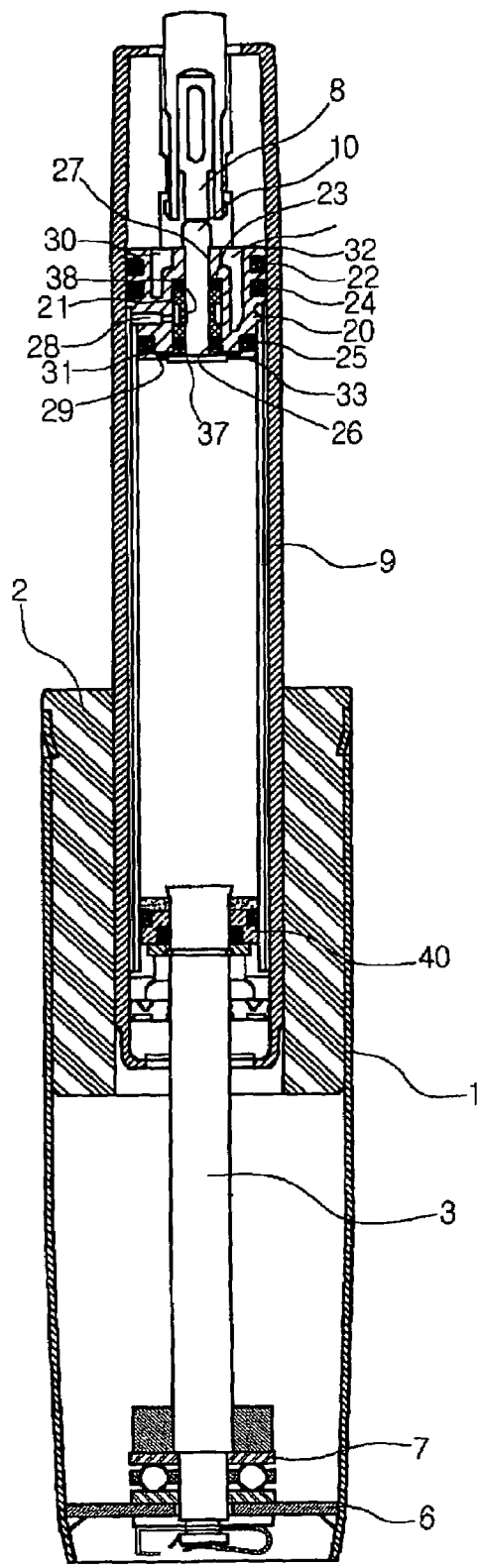
FIG. 1 is a cross-sectional view of a gas cylinder according to the present invention.

FIG. 1 is a cross-sectional view of a gas cylinder according to the present invention.

Referring to FIG. 1, the gas cylinder according to the present invention, includes: a base tube 1; a guide tube 2 in the inside of the base tube 1; a spindle 9 inserted in the inside of the guide tube 2; a piston 40 dividing a cylinder formed in the inside of the spindle 9 into up and down two chambers; a piston rod 3 whose one end is fixed in the piston 40 and whose other end is fixed in the lower end of the base tube 1; a base 7 through which the lower end of the piston rod 3 passes; a spindle supporter 6 formed on the lower side of the base 7, and in which the lower part of the piston rod 3 is fixed; and a fixing clip 50 in which the lower end of the piston rod 3 is fixed. In the meantime, the upper and the lower ends of the base tube 1 are tapered a little inward in their ends, for being forcibly fit in a seat and a chair base, respectively.

Here, the upper end of the spindle 9 has an operating pin 8 for operating a column unit, and the operating pin 8 is positioned on a gas opening/closing pin 10 fit in a valve 20 that is installed in the upper end of the cylinder.

Particularly, the valve 20 is formed by one single body of an integral type, so that assembly process of the gas cylinder could be performed in a convenient and simple manner.

Operation of the gas cylinder having the foregoing construction will be briefly described in the following.

If the operating pin 8 is given force to the lower side by external force, the gas opening/closing pin 10 goes down, so that up and down spaces of the two chambers partitioned by the piston 40 are connected and up and down height of the spindle 9 is adjusted.

More specifically, FIG. 1 shows the position when the spindle 9 goes up to the upper extreme. Also, if force for overcoming expanding force of pressed gas, exemplified as force by a weight of a user is applied to the spindle 9 after two chambers partitioned by the piston 40 are connected through pressing of the operating pin 8, the spindle 9 is lowered down. At the moment, the pressed gas flows into the chamber positioned in the lower side with respect to the piston 40.

Conversely, if the operating pin 8 is pressed with the spindle 9 lowered down, the spindle 9 is raised up by the pressure of the gas and restored to the status as shown in FIG. 1. At this moment, the pressed gas flows into the chamber positioned in the upper side with respect to the piston 40.

As described above, complicated and various flowing of the pressed gas occurs in the inside of the gas cylinder, and in order for such flowing of the pressed gas to occur reliably without leakage, it is important to realize sealing structure completely.

Also, for this purpose, it is important to accurately secure deviation from coaxialities for the spindle 9, the piston 40, and the piston rod 3. In addition, it is also important to secure convenience in process so that an operator could carry out such process conveniently.

Construction of the present invention for complete sealing structure of the gas cylinder, securing of deviation from coaxiality, and convenience in process as described above, will be described in more detail in the following.

Figure 2:
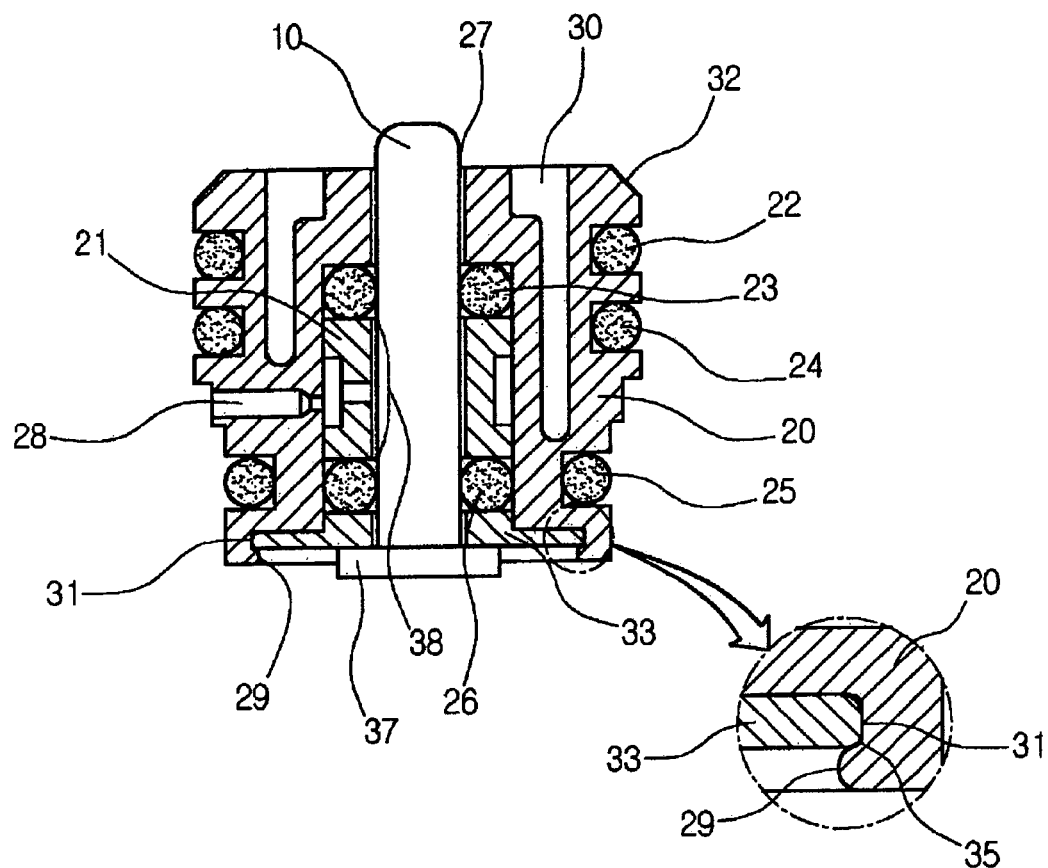
FIG. 2 is an enlarged view of a valve part in a gas cylinder according to the present invention.

FIG. 2 is an enlarged view of the valve part in the gas cylinder according to the present invention.

Referring to FIG. 2, the valve 20 includes an inner valve 21, a valve dividing body 33, and a plurality of O-rings 22, 23, 24, 25, 26. Also, the valve 20 has a gas opening/closing pin 10 in a through hole 27 formed approximately at its center, so that flowing of the gas is continued or blocked by up and down movement of the gas opening/closing pin 10.

More specifically, the valve 20 has three grooves in its outer peripheral surface, and the O-rings 22, 24, 25 are fit in each groove, respectively, so that leakage of the gas is prevented. Also, a through hole 27 through which the gas opening/closing pin 10 passes, is provided in the center of the valve 20.

The through hole 27 consists of three parts of different diameters, including: a part whose diameter is maintained at the diameter of the gas opening/closing pin 10 for a predetermined length from the upper part; a part of a wide diameter for receiving the inner holder 21; and a groove part 31 of a wider diameter positioned at the lower end. Particularly, the valve has a projecting part 29 bent inward at the groove part 31 positioned in its lower end, and the end of the projecting part 29 is rounded.

Also, from the upper end to the lower side of the valve 20, a plurality of grooves 30 is formed for reducing volume of the valve 20, thereby reducing material costs.

Also, the valve has an inclined plane 32 in its upper outer peripheral edge. The inclined plane 32 is for the valve 20 to be conveniently inserted when the valve is inserted to the inside of the spindle. For this purpose, the outer peripheral surface at the upper end of the valve 20 forms the inclined plane 32. Such inclined plane 32 is formed in an integral type, so that the valve 20 which may be difficult to insert, could be more easily inserted to the inside of the cylinder, by which function of the inclined plane is fulfilled.

The inner holder 21 is installed in the through hole 27, for supporting the gas opening/closing pin 10 upon up and down movement of the gas opening/closing pin 10, and O-rings 23, 26 are installed on the upper and the lower part of the inner holder 21, respectively. Also, a concave groove 38 for intermittently passing the pressed gas through a passing port 28 is formed on the outer peripheral surface of the gas opening/closing pin 10 faced with the inner side of the inner holder 21. By up and down movement of the concave groove 38, the passing port 28 and the pressed gas chamber in the inside of the spindle are intermittently connected or blocked. Particularly, the gas opening/closing pin 10 has a header 37 in its lower end, for intermittently passing the pressed gas reliably. FIG. 2 shows the status that the pressed gas is blocked.

Figure 3:
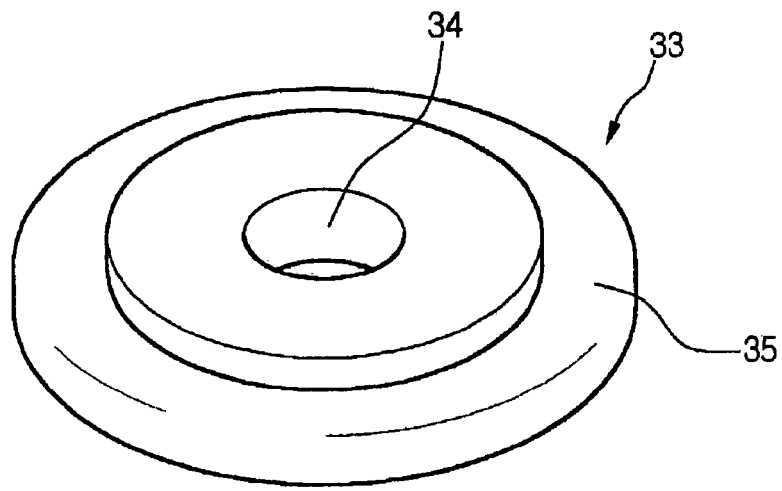
FIG. 3 is a perspective view of a valve dividing body according to the present invention.

The valve dividing body 33 made of plastic injection material is fit in the lower part of the O-ring 26 installed in the lower part of the inner holder 21, and the valve dividing body 33 could be understood by a perspective view of the valve dividing body 33 shown in FIG. 3.

Referring to FIG. 3, the valve dividing body 33 is of a ring shape having a hole 34 on the disk, and the outer diameter of the valve dividing body 33 is a little larger than a diameter of the projecting part 29 and the end portion 35 of the valve dividing body 33 is rounded for easy insertion.

In the meantime, as the valve dividing body is made of plastic material having some elasticity, the end portion 35 is inserted to the groove part 31 if predetermined force is applied on the valve dividing body 33 in the inside direction upon assembling, and once being assembled, the end portion 35 of the valve dividing body 33 is hooked at the projecting part 29 and not detached.

As the valve dividing body 33 could be properly fixed by such simple procedure, an operator could complete manufacturing more simply. Also, as stronger force than is necessary needs not to be applied in order to fix the valve dividing body 33, deviation from coaxiality may be easily accomplished.

Therefore, upon assembling, the O-ring 23, the inner holder 21, and another O-ring 26 are sequentially inserted from the lower part of the valve 20 and assembled, and after that, at that status, if the valve dividing body 33 is pushed into the inside, the inserted parts are stably fixed and lastly the gas opening/closing pin 10 is assembled.

As described above, the valve dividing body 33 could be joined by a simple manner, and further, there exists little danger that deviation from coaxiality of the gas cylinder would be disheveled, for stronger external force than is necessary is not applied.

Figure 4:
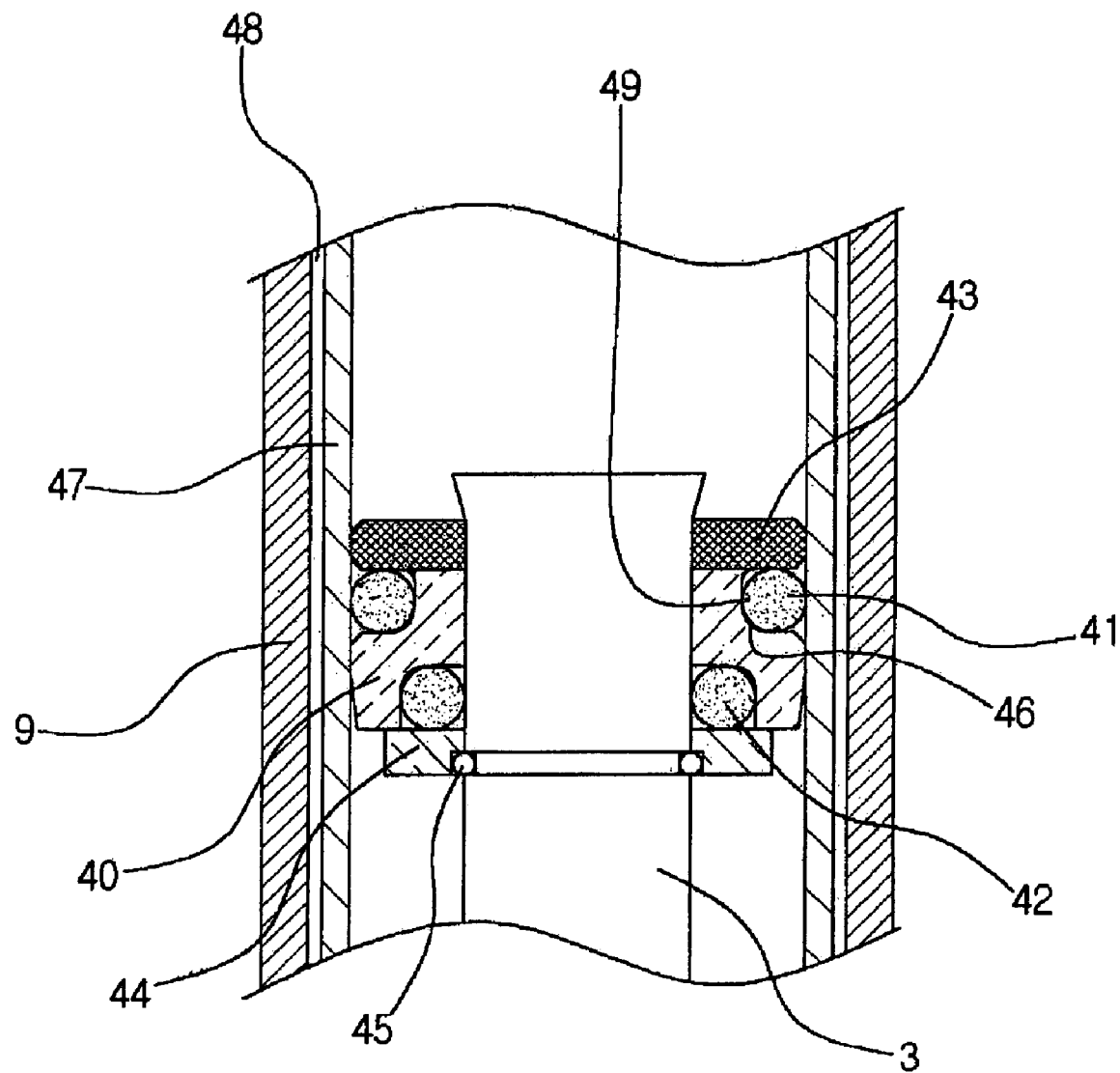
FIG. 4 is an enlarged view of a piston part of a gas cylinder according to the present invention.

FIG. 4 is an enlarged view of the piston part of the gas cylinder according to the present invention.

Referring to FIG. 4, the piston 40 formed on the upper end of the piston rod 3, the cylinder 47 contacting with the outer periphery of the piston 40, and a flowing hole 48 for being connected with the passing port(refer to reference numeral 28 in FIG. 2) so that the pressed gas flows, are provided.

Particularly, the piston 40 is stuck on the inner wall of the cylinder 47, for possibly moving up and down with up and down spaces formed in the inside of the spindle 9 sealed each other.

The piston 40 is made of plastic material of a ring shape in order to seal the piston rod 3 and the inner wall of the cylinder, and includes: the first step threshold 49 formed over the interval ranging up to a predetermined length from the upper end, in which the first O-ring 41 contacting the inner wall of the cylinder 47 is fit; another step threshold formed over the interval ranging up to the lower end from the lower part of the first step threshold 49, in which the second O-ring 42 contacting the outer peripheral surface of the piston rod 3 is fit; and the washer 43 additionally fit in the upper end of the piston 40.

Particularly, the piston 40 is of a ring shape, and has: the first step threshold 49 of a circular shape, formed over the interval ranging up to almost the half height of the piston from the upper end along its outer peripheral surface, for receiving the first O-ring 41; and another step threshold of a circular shape, formed over the interval ranging up to also the half height of the piston from the lower part of the first step threshold 49 along its inner peripheral surface, for receiving the second O-ring 42. The outer diameter of the first step threshold 49 is smaller than the inner diameter of the cylinder 47, and more specifically, smaller than the diameter of the cylinder 47 as much as the diameter the first O-ring 41 contracts and reduces.

Therefore, the first and the second O-rings 41, 42 are installed for contacting the inside of the cylinder 47, and the outside of the piston rod 3, respectively.

Figure 5:
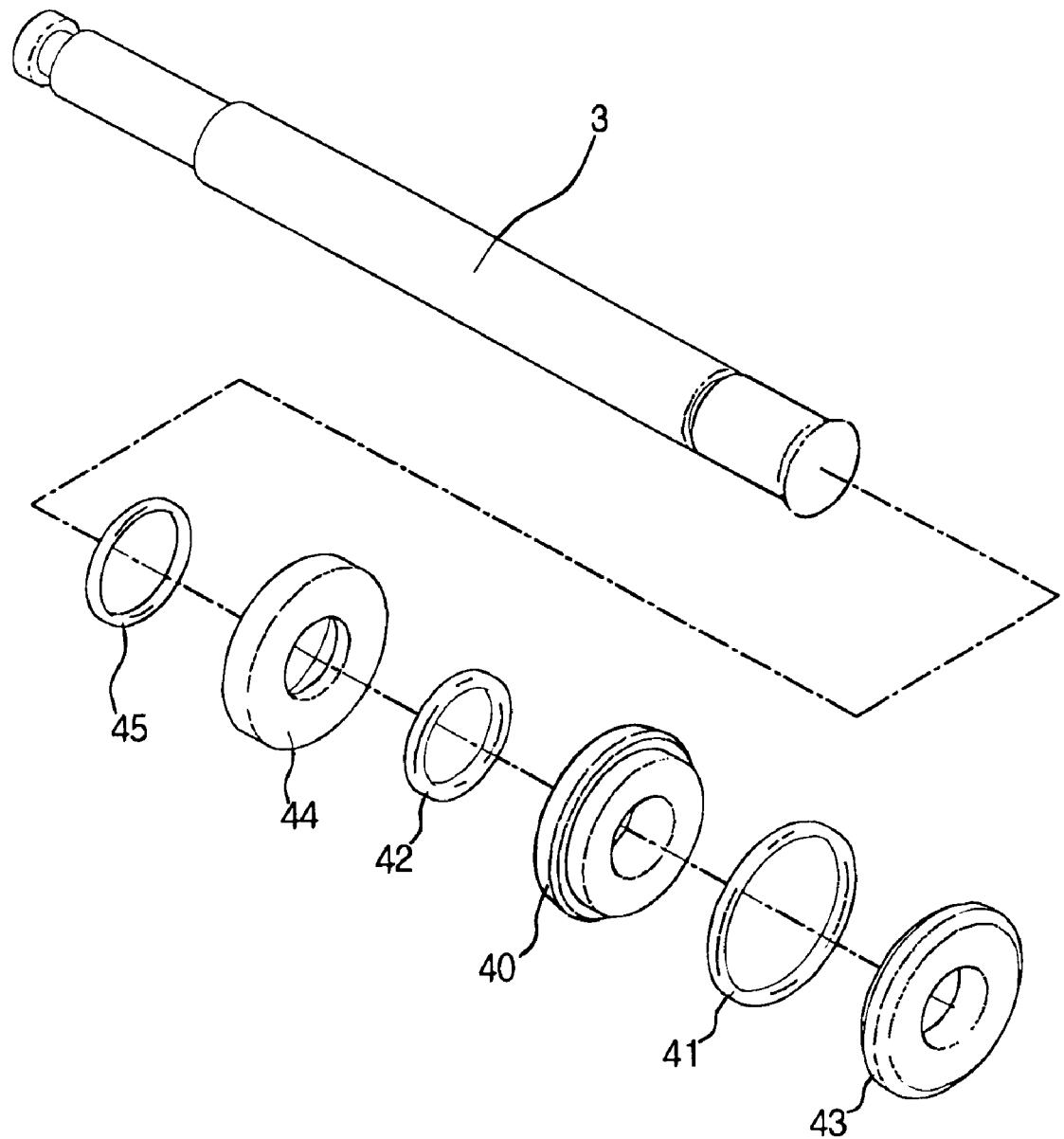
FIG. 5 is an exploded, perspective view of a piston part according to the present invention.

FIG. 5 is an exploded, perspective view of the piston part according to the present invention.

Referring to FIG. 5, assembling is performed in an order of the washer 43, the first O-ring 41, the piston 40, the second O-ring 42, the ring cover 44, and lastly a spring ring 45 is fit in a groove of a circular shape positioned at a predetermined distance from the upper end of the piston rod 3, whereby assembling is completed.

Here, the washer 43 is fit for preventing detachment of the first O-ring from the piston 40. Of course, the washer 43 is of a size of not contacting the inner periphery of the cylinder 47.

In the meantime, the inner edge of the first step threshold 49 for receiving the first O-ring 41 forms a rounding part 46 smoothly bent, which is for making sealing by the first O-ring firm even more.

As the piston 40 is made of plastic as described above, there exists no possibility that scratch is generated even when the piston scrapes the inner periphery of the metal cylinder 47 during up and down movement of the spindle 9. As there exists on possibility that the scratch is generated on the inner periphery of the cylinder 47, there exists no possibility that the pressed gas leaks out.

Also, the metal washer 43 is for preventing the O-ring from being detached from the piston 40, and is not contacted with the cylinder 47, so that there exists no possibility that the scratch is generated on the inner periphery of the cylinder 47.

Resultantly, sealing between the piston 40 and the inner periphery of the cylinder 47 is achieved by the two first and second O-rings 41, 42. Particularly, as the inner periphery of the first O-ring 41 is plane-contacted and fixed by the rounding part 46, the first O-ring 41 could be more reliably stuck on the inner periphery of the cylinder 47. Namely, leakage prevention for the pressed gas filled in the inside of the cylinder 47 could be reliably achieved.

Figure 6:
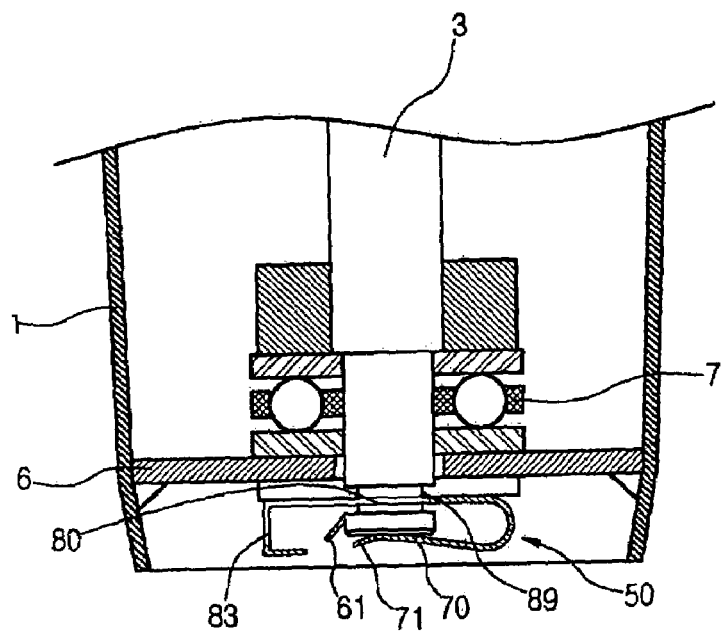
FIG. 6 is an enlarged, perspective view of a fixing clip part in a gas cylinder according to the present invention.

FIG. 6 is an enlarged, perspective view of the fixing clip in the gas cylinder according to the present invention.

Referring to FIG. 6, the fixing clip 50 of the gas cylinder according to the present invention is formed by the two sides of elastic material panel bent in a U-shape mutually faced. The fixing clip 50 has the cuts 81 and 82 for receiving a circular-shaped groove part 89 of the piston rod 3 on its one side 80, and has a cut 63 having a hole for receiving the lower end of the piston rod 3 on its other side 60.

Figure 7:
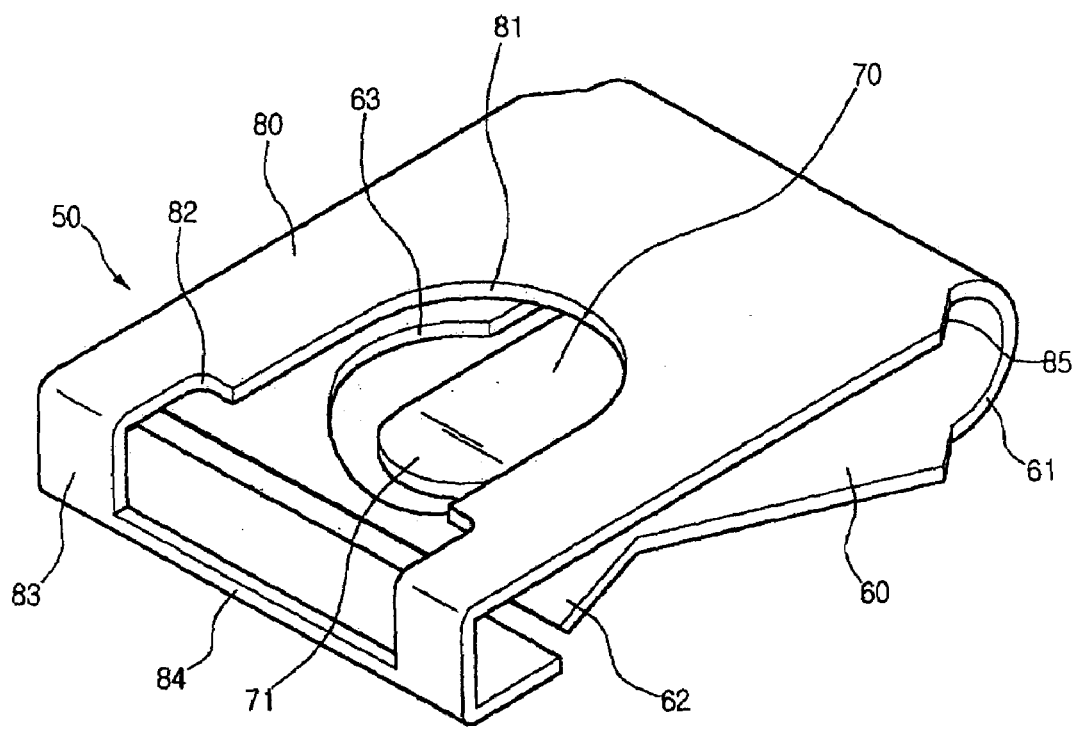
FIG. 7 is a front, perspective view of a fixing clip according to the present invention.
Figure 8:
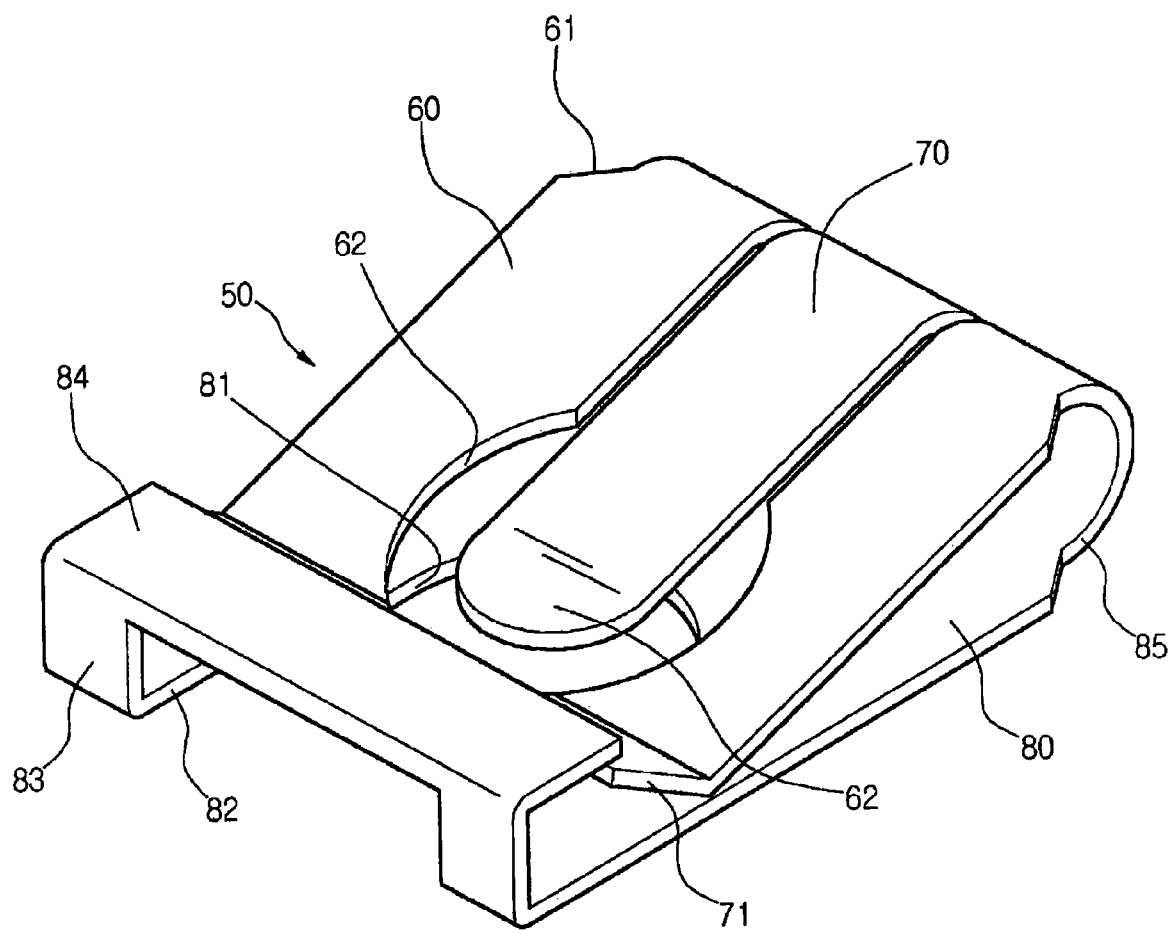
FIG. 8 is a back, perspective view of a fixing clip according to the present invention.
Figure 9:
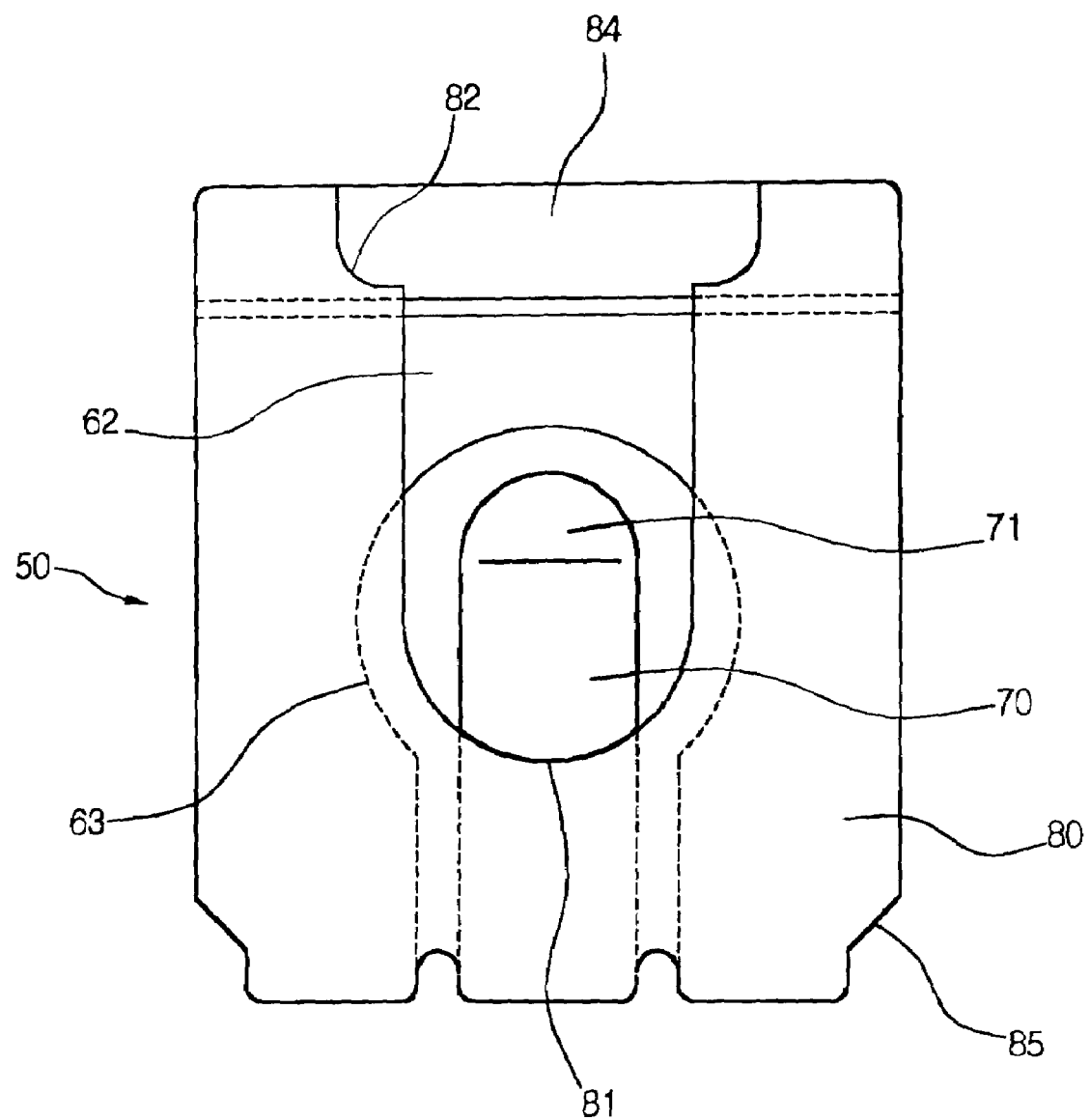
FIG. 9 is a plan view of a fixing clip according to the present invention.
Figure 10:
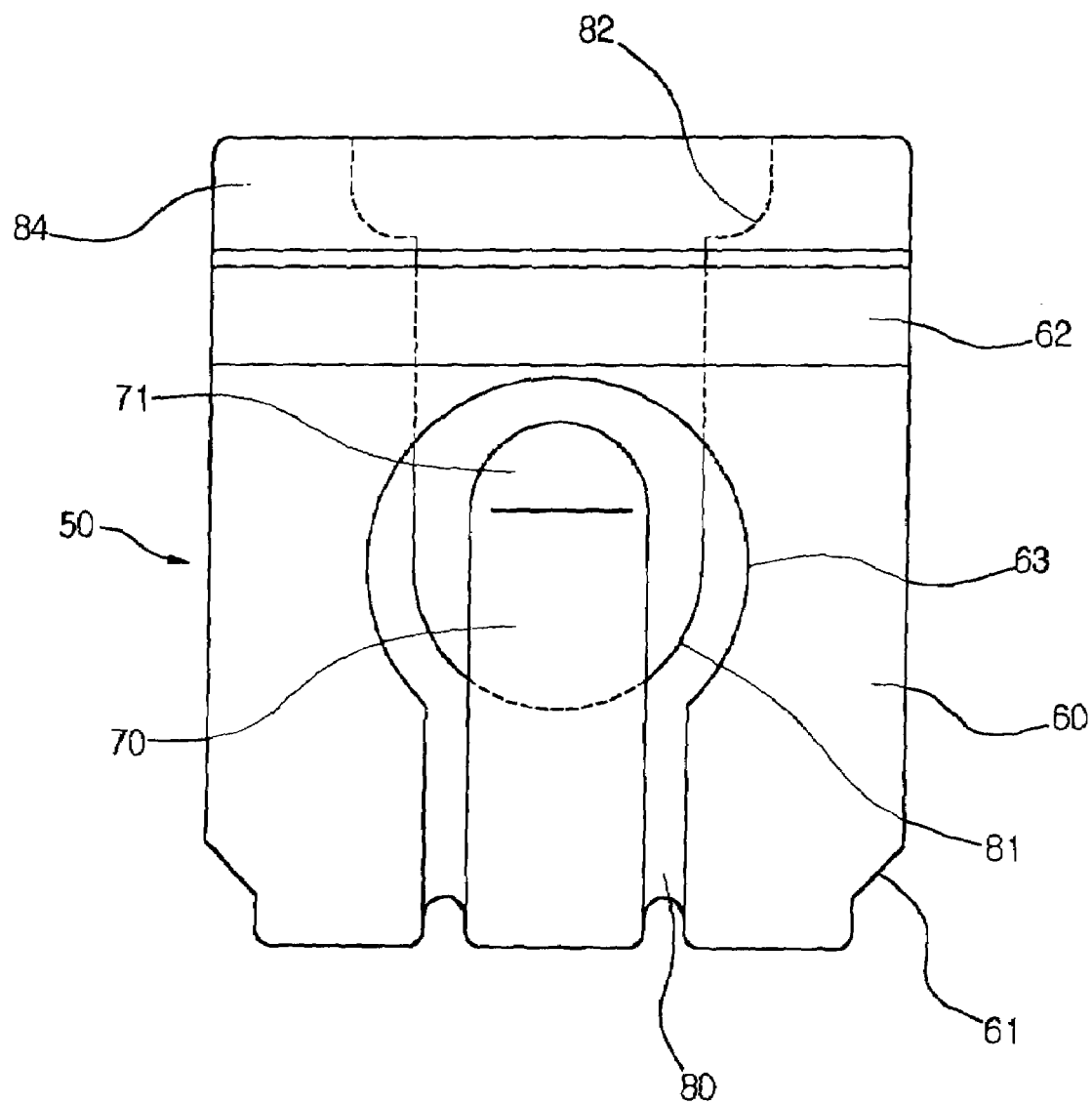
FIG. 10 is a backside view of a fixing clip according to the present invention.
Figure 11:
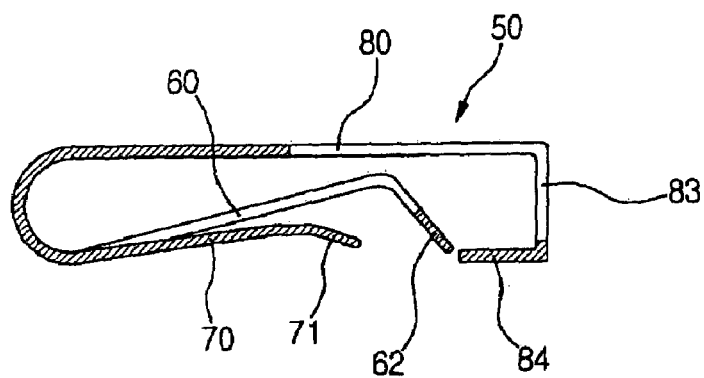
FIG. 11 is a sided view of a fixing clip according to the present invention.

FIG. 7 is a front, perspective view of the fixing clip according to the present invention, FIG. 8 is a back, perspective view of a fixing clip according to the present invention, FIG. 9 is a plan view of a fixing clip according to the present invention, FIG. 10 is a backside view of a fixing clip according to the present invention, and FIG. 11 is a sided view of a fixing clip according to the present invention.

Referring to FIG. 7 through FIG. 10, the shape and operation of the fixing clip applied to the gas cylinder of the present invention will be described.

The one side 80 of the clip has the cuts 81 and 82 cut in their center from their end parts.

More specifically, the cuts 81 and 82 consist of: the first cut 82 cut as much as a predetermined width along the same distance starting from the width where the lower end of the piston rod 3 could pass through; and the second cut 81 whose width gets narrow and is finished in a circular shape, for being fit in the circular-shaped groove part 89 of the piston rod 3.

Both parts formed by the cuts 81 and 82 on the one side 80 of the fixing clip 50 are bent as much as 90° in their ends, to the direction of the other side 60 of the clip 50, and meet again, for forming guiding parts 83 and 84 for guiding the lower end of the piston rod 3.

Therefore, the lower end of the piston rod 3 could pass the first cut 82 on the one side 80 of the clip 50, but could not pass the second cut 81, while the circular-shaped groove part 89 of the piston rod 3 could pass both the first and the second cuts 81, 82.

Also, the other side 60 of the clip 50 is shorter in its length than the one side 80 of the clip 50, and the end 62 of the other side 50 is bent for being almost connected with the one side 80 of the clip 50, and the end 62 is again bent outward, for functioning of guiding the lower end of the piston rod 3.

In the meantime, the other side 60 of the clip 50 has the cut 63, and the cut 63 formed at a predetermined distance apart from the end 63, is a circular hole having such a diameter for receiving the lower end of the piston rod 3. Also, the third interval portion having a smaller diameter than the diameter of the lower end of the piston rod 3 whose diameter is smaller than the diameter of the hole, is extended from the hole. The third interval portion is extended up to the portion where the one side 80 of the clip 50 begins to bend.

Also, the other side 60 of the clip 50 has a pressing part 70 for pressing the lower end of the piston rod 3 when the clip 50 is fit in the piston rod 3. The pressing part 70 extended from the part where the third interval portion begins, up to the circular hole of the cut 63 on the other side 60 of the clip 50, and the end 71 of the pressing part 70 is also bent outward.

More specifically, the pressing part 70 is less bent than the extent the other side 60 of the clip 50 is bent toward the one side 80 of the clip 50. Therefore, when the lower end of the piston rod 3 passes through the hole of the cut 63 on the other side 60 of the clip 50, the pressing part 70 presses elastically the lower end of the piston rod 3.

In the meantime, edge cut portions 61 and 85 are formed between the one side 80 and the bent portion of the other side 60 in the clip 50.

Operation of the fixing clip 50 will be described in detail with reference to FIG. 6. The one side 80 of the clip 50 is hooked at the lower threshold of the circular-shaped groove part 89 in the lower end of the piston rod 3, and the pressing part 70 in the other side 60 of the clip 50 presses the lower end of the piston rod 3. Therefore, combining of the piston rod 3 to the spindle support 6 is completed by joining of the clip 50.

The order in which the fixing clip 50 is joined will be described in detail in the following.

The circular-shaped groove part 89 of the piston rod 3 goes through the spindle supporter 6, and then the clip 50 is pushed from the side with the edge cut portions 61 and 85 of the clip 50 taken with fingers by an operator. On the first place, after portion ranging from the lower end of the piston rod 3 up to the lower end threshold of the circular-shaped groove part 89 in the piston rod 3, is put between the one side 80 and the guiding parts 83, 84 of the clip 50, the clip 50 begins to be fit.

Then, the lower end of the piston rod 3 is inserted between the one side 80 and the guiding parts 83, 84 of the clip 50, pushing the end 62 of the other side 60 of the clip 50 in the outward direction. At the moment, the circular-shaped groove part 89 of the piston rod 3 passes through the first cut 82 on one side 80 of the clip 50 and is settled down on the second cut 81. At that status, if the clip 50 is pushed further, the one side 80 and the other side 60 of the clip 50 get apart even further, and resultantly, the circular-shaped groove part 89 of the piston rod 3 is hooked at the end of the second cut 81 and simultaneously the lower end of the piston rod 3 passes through the hole of the cut 63 on the other side 60 of the clip 50, so that the pressing part 70 on the other side 60 of the clip 50 begins to press the lower end of the piston rod 3.

By the foregoing procedure, joining of the clip 50 is completed. At the moment, the other side 60 of the clip 50 is restored to its original position by its elastic force, so that the clip 50 is not detached from the piston rod 3.

Figure 12:
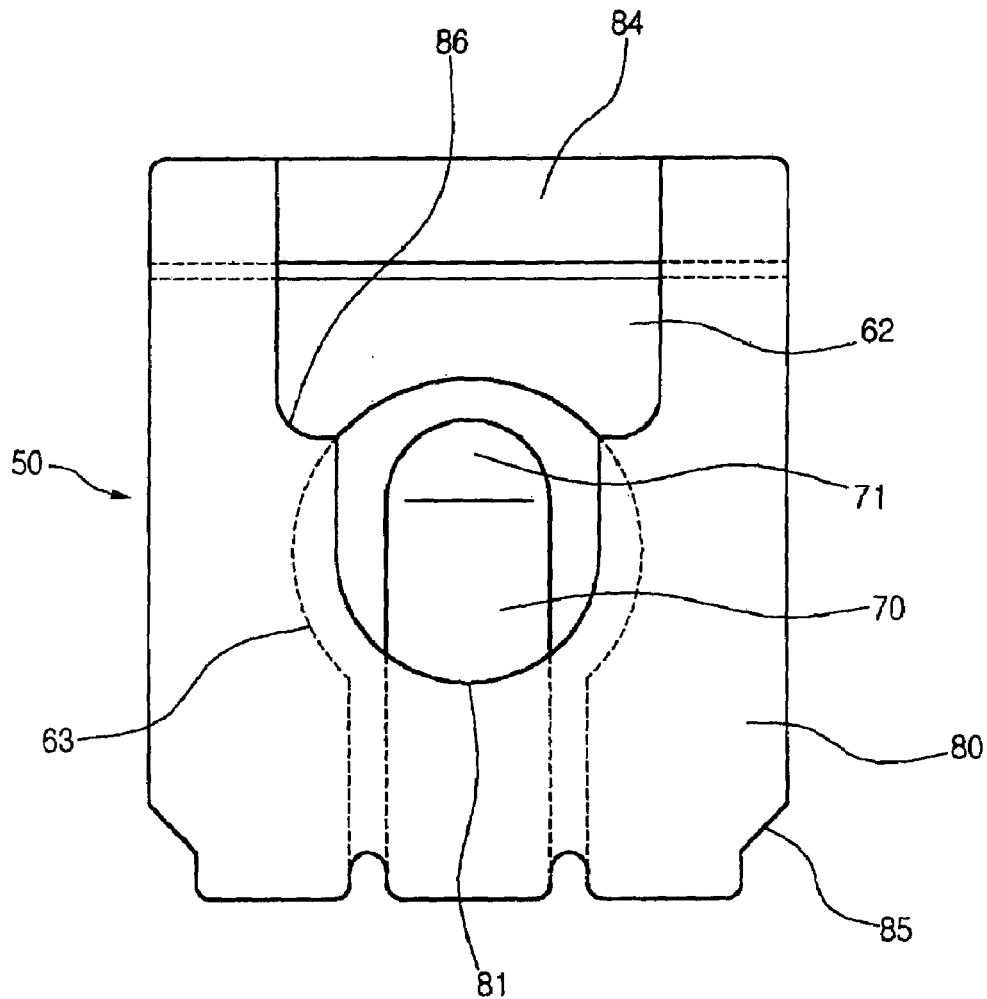
FIG. 12 is a plan view showing another embodiment of a fixing clip.
Figure 13:
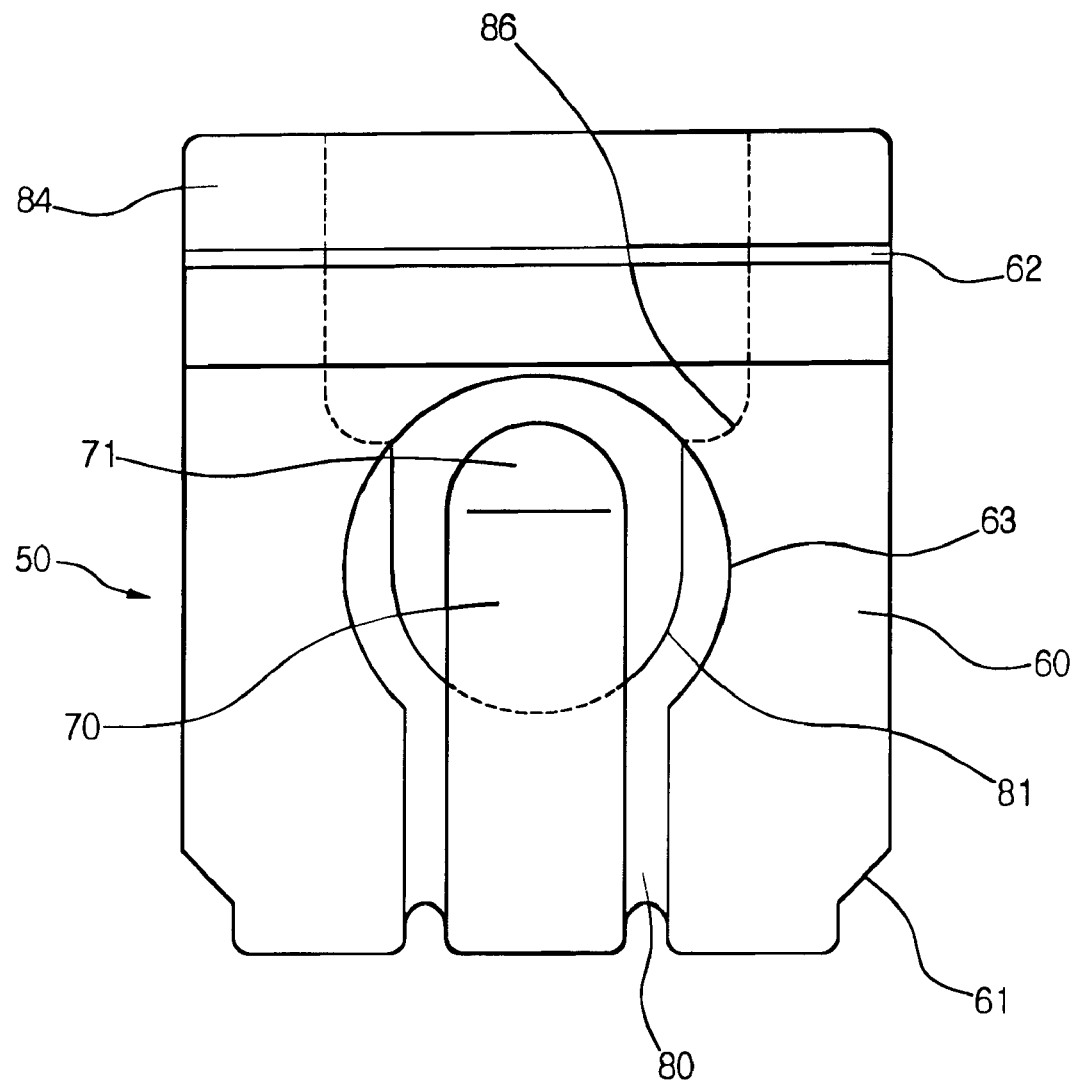
FIG. 13 is a backside view showing another embodiment of a fixing clip.

FIG. 12 is a plan view showing another embodiment of the fixing clip, and FIG. 13 is a backside view showing another embodiment of the fixing clip.

Referring to FIG. 12 and FIG. 13, other parts of the fixing clip are the same as those described above, except that the first cut 82, unlike the original shape, is formed longer so that the clip 50 could be inserted to and drawn out from the lower end of the piston rod 3 more easily.

As such fixing clip could be pushed into the side of the lower end of the piston rod 3 in a simple manner, efficiency of an operator is improved even more.

Also, the fixing clip has edge cut portions for an operator to possibly carry out process, taking the clip more easily, so that process becomes very easy.

Figure 14:
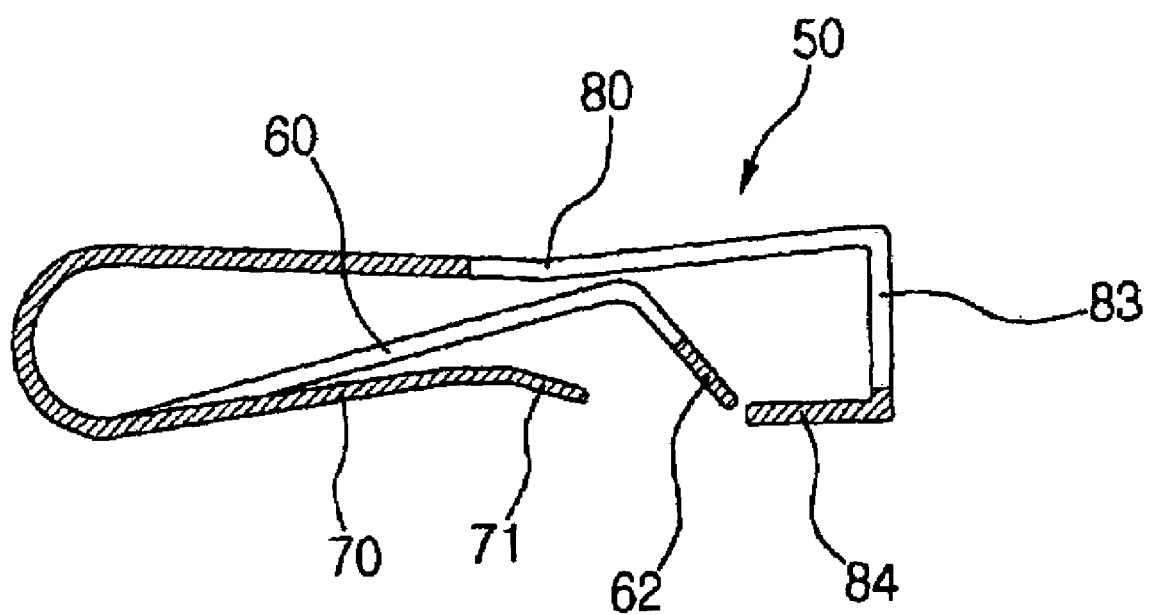
FIG. 14 is a view illustrating another embodiment of a fixing clip.

FIG. 14 is a drawing showing further another embodiment of the fixing clip according to the present invention.

Referring to FIG. 14, other parts of the fixing clip according the further another embodiment of the present invention are the same as those described above, except that the one side 80 of the fixing clip 50 collapses in a dented manner with respect to the center.

The one side 80 of the clip 50 is formed by collapsing in a dented manner, whereby the end of the piston rod 3 could be fixed firmly in its position by the one side 80 together with the other side 60 of the clip 50.

Figure 15:
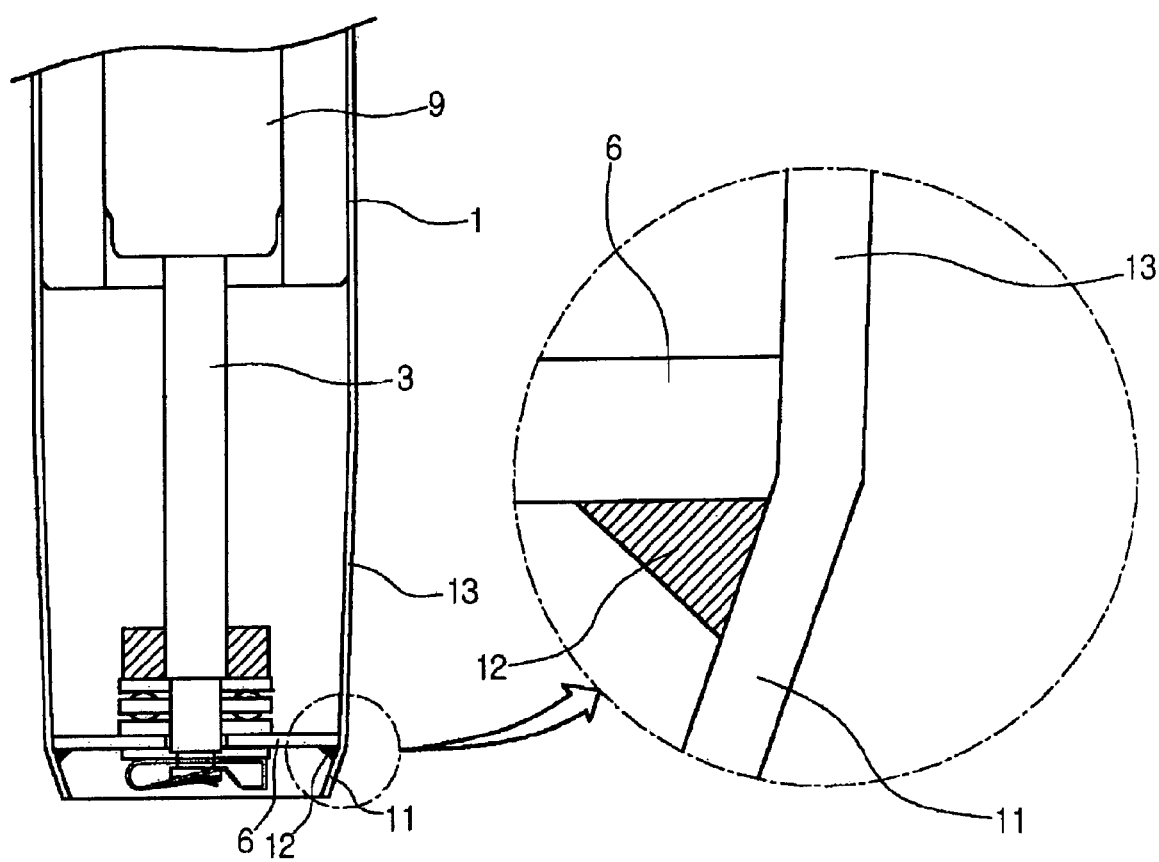
FIG. 15 is an enlarged, cross-sectional view of a lower part of a gas cylinder according to the present invention.

FIG. 15 is a cross-sectional view of the lower part of the gas cylinder according to the present invention, in which the lower part of the base tube is particularly magnified.

Referring to FIG. 15, the lower part of the gas cylinder according to the present invention includes: a spindle supporter 6 as described already in FIG. 1; a welding part 12 where the spindle supporter 6 is joined to a base tube 1 by means of welding; a lower bending part 11 where the base tube 1 whose lower side from the welding part 12 is bent inward; and a taper part 13 formed in the upper side of the welding part 12, for being smoothly bent in the downward direction.

The lower bending part 11 prevents the taper part 13 from not properly being inserted by thermal transformation of the base tube 1 occurring due to heat generated from the welding part 12 in case that the base tube 1 is forcibly fit in the chair base 90.

More specifically, in case that the welding part 12 is welded in the inside of the base tube 1, thermally transformed portion is generated on the outer periphery of the base tube 1 by heat applied upon welding. The thermally transformed portion forms unevenness or projecting part on the outer periphery of the base tube 1, or further forms projecting portion. Such thermally transformed portion becomes hindrance in inserting the taper part 13 into the chair base 90.

Therefore, the taper part 13 of the gas cylinder is not completely fit in the chair base 90, and wobble is generated, causing inconvenience to a user.

In order to prevent such problems, the lower side of the base tube 1 is bent inward with respect to the welding part 12, so that even in case that unevenness or projecting part is generated by welding, the unevenness or the projecting part could be bent inward or smoothly evened.

Figure 16:
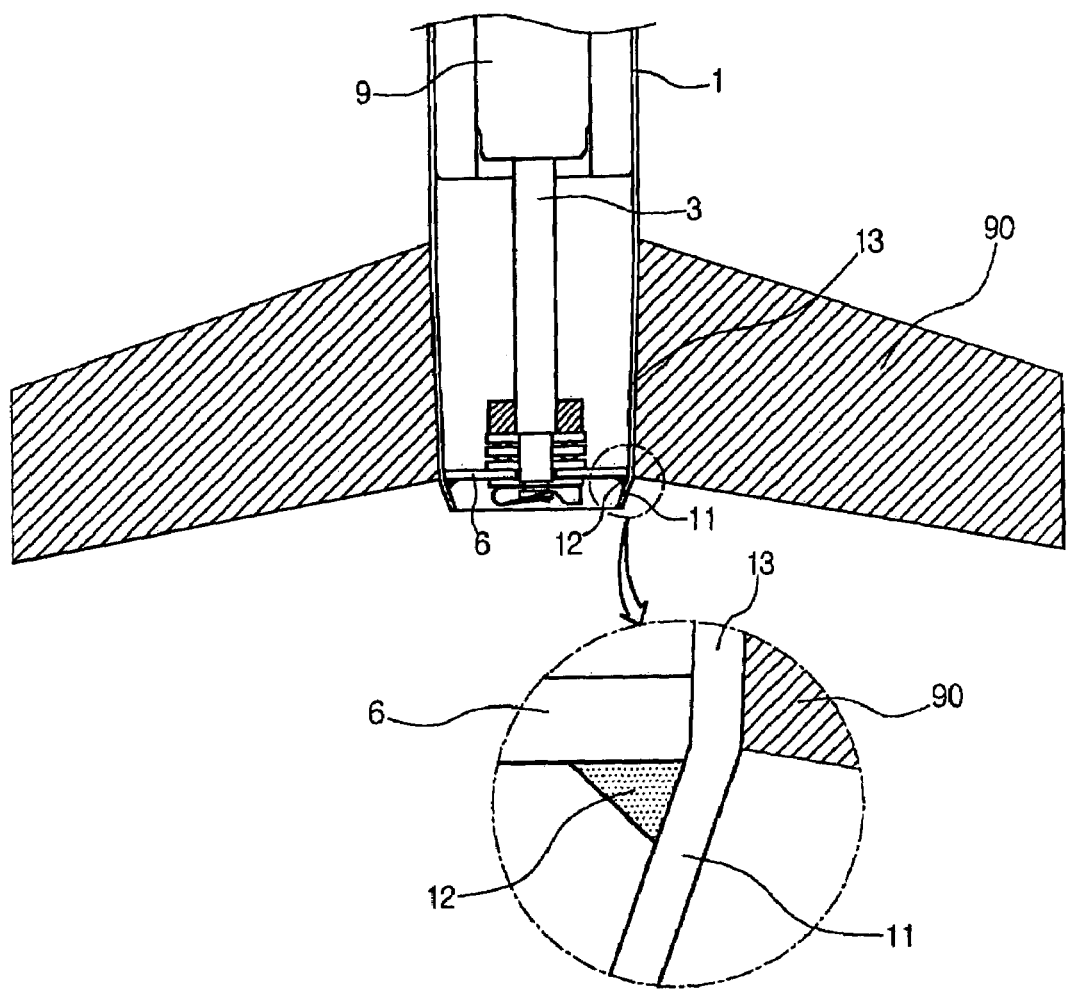
FIG. 16 is a cross-sectional view illustrating a status that a gas cylinder is fit in a chair base according to the present invention.

FIG. 16 is a cross-sectional view showing the status that the gas cylinder of the present invention is fit in the chair base, and in which the lower part of the base tube is magnified.

Referring to FIG. 16, the tapered part of the chair base and the taper part 13 of the base tube 1 form a complete plane contact each other.

With such structure, the taper part 13 of the gas cylinder could be exactly fit in the tapered part of the chair base 90, and wobble of the chair could be prevented.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A gas cylinder comprising:
    an integral type valve having a gas opening/closing pin at a through hole in its center, for intermittently passing a gas, and additionally having a valve dividing body seated on a groove approximately in a lower part of the through hole;
    a spindle to an upper inside of which the valve is inserted;
    a piston inserted to an inside the spindle, the piston having a first step threshold formed at a predetermined distance from an upper end, to which a first O-ring for maintaining sealing is fit, wherein the first step threshold is of a bending round shape for guiding position of the first O-ring, the piston further having a second step threshold to which a second O-ring is fit on an inner lateral surface of the piston, ranging from a lower side of the first step threshold up to a lower end;
    a cylinder formed on an inner peripheral surface of the spindle, for guiding the piston;
    a washer additionally formed on an upper end of the piston;
    a piston rod whose one end is inserted and fixed to the piston; and
    a base tube of a cylindrical shape, in a lower side of which the other end of the piston rod is fixed by means of a fixing clip, and whose inner peripheral surface guides up and down movement of the spindle.

2. The gas cylinder according to claim 1, wherein the piston is made of plastics.

3. The gas cylinder according to claim 1, wherein the washer is made of metal.

4. The gas cylinder according to claim 1, wherein the first step threshold has a smaller outer diameter than an inner diameter of the cylinder.

5. The gas cylinder according to claim 1, wherein the first O-ring placed on the first step threshold is plane-contacted with an inner periphery of the cylinder.

6. The gas cylinder according to claim 1, wherein the groove has, in its lower side, a projecting part whose inner diameter is smaller than an inner diameter of the groove.

7. The gas cylinder according to claim 6, wherein the projecting part is smoothly rounded so that the valve dividing body could be easily fit.

8. The gas cylinder according to claim 1, further comprising a groove and an O-ring fit in the groove provided to an outer periphery of the valve.

9. The gas cylinder according to claim 1, wherein the valve dividing body is made of plastics.

10. The gas cylinder according to claim 1, wherein a lower end of the base tube has a lower bending part bent inward, for being safely inserted to a chair base.

11. The gas cylinder according to claim 1, further comprising:
a taper part formed in a lower side of the base tube, for being inserted to a chair base; and
a lower bending part formed in a lower end of the taper part, for eliminating unevenness or projecting part of the base tube.

12. The gas cylinder according to claim 1, wherein a lower bending part for eliminating unevenness or projecting part of the base tube, generated upon welding of a spindle supporter, is formed on a lower end of the base tube.

13. The gas cylinder according to claim 1, further comprising:
a plurality of grooves extended to a lower side from an upper end of the valve, for reducing volume of the valve.

14. A gas cylinder comprising:
an integral type valve having a gas opening/closing pin at a through hole in its center, for intermittently passing a gas, and additionally having a valve dividing body seated on a groove approximately in a lower part of the through hole, wherein an inclined plane is formed on an upper outer periphery of the valve;
a spindle to an upper inside of which the valve is inserted;
a piston inserted to an inside of the spindle, the piston having a first step threshold formed at a predetermined distance from an upper end, to which a first O-ring for maintaining sealing is fit, the piston further having a second step threshold to which a second O-ring is fit on an inner lateral surface of the piston, ranging from a lower side of the first step threshold up to a lower end;
a cylinder formed on an inner peripheral surface of the spindle, for guiding the piston;
a washer additionally formed on an upper end of the piston;
a piston rod whose one end is inserted and fixed to the piston; and
a base tube of a cylindrical shape, in a lower side of which the other end of the piston rod is fixed by means of a fixing clip, and whose inner peripheral surface guides up and down movement of the spindle.

15. A gas cylinder comprising:
an integral type valve having a gas opening/closing pin at a through hole in its center, for intermittently passing a gas, and additionally having a valve dividing body seated on a groove approximately in a lower part of the through hole;
a spindle to an upper inside of which the valve is inserted;
a piston inserted to an inside of the spindle, the piston having a first step threshold formed at a predetermined distance from an upper end, to which a first O-ring for maintaining sealing is fit, the piston further having a second step threshold to which a second O-ring is fit on an inner lateral surface of the piston, ranging from a lower side of the first step threshold up to a lower end;
a cylinder formed on an inner peripheral surface of the spindle, for guiding the piston;
a washer additionally formed on an upper end of the piston;
a piston rod whose one end is inserted and fixed to the piston; and
a base tube of a cylindrical shape, in a lower side of which the other end of the piston rod is fixed by means of a fixing clip, and whose inner peripheral surface guides up and down movement of the spindle, wherein the fixing clip comprises one side and the other side made of elastic material, bent in a U-shape, and whose two ends are mutually faced; the one side having a cut whose width, from an end part, is smaller than a diameter of the piston rod and is larger than a diameter of a groove of the piston rod, for being fit in the groove of the piston rod: the other side having, a part a predetermined distance from an end part, a cut whose width is larger than a diameter of the piston rod so that a lower end of the piston rod passes through to a lower side after passing by a predetermined distance between the one side and the other side of the clip; and a pressing part being extended from the cut formed on the other side of the clip, for pressing the lower end of the piston rod, wherein the one side of the clip is formed longer than the other side of the clip.

16. The gas cylinder according to claim 15, wherein the one side of the clip is a plane.

17. The gas cylinder according to claim 15, wherein the other side of the clip is bent outward in its end.

18. The gas cylinder according to claim 15, wherein the one side of the clip is formed by collapsing toward the other side of the clip.

19. A gas cylinder comprising:
an integral type valve having a gas opening/closing pin at a through hole in its center, for intermittently passing a gas;
a spindle to an upper inside of which the valve is inserted;
a piston inserted to an inside of an open cylinder of the spindle;
a piston rod whose one end is inserted and fixed to the piston; and
a base tube of a cylindrical shape, in which the other end of the piston rod is fixed, and to which the piston rod is inserted, and whose lower end is bent inward, forming a lower bending part for removing unevenness or projecting part due to thermal transformation of the base tube, wherein the lower bending part beginning at a spindle supporter part in which the piston rod is fixed, is extended to a lower side.

* * * * *